June 17, 1941.　　　　J. A. CRUM　　　　2,246,349

FLY ASH TRAP

Filed March 7, 1938

INVENTOR.
BY John A. Crum
Wood & Wood
ATTORNEYS

Patented June 17, 1941

2,246,349

UNITED STATES PATENT OFFICE 2,246,349

FLY ASH TRAP

John A. Crum, Arlington Heights, Ohio, assignor to The Nivison-Weiskopf Company, Reading, Ohio, a corporation of Ohio Application March 7, 1938, Serial No. 194,387

8 Claims. (Cl. 183—75)

This invention relates to traps or separators associated with the flues, or smokestacks, of furnaces, and adapted to arrest solid matter such as fly ash and cinders, carried by the smoke, and normally discharged into the atmosphere. The present invention is directed to an improved device of this nature, which has a broader scope of application than the devices heretofore available, and which is simplified in design and highly efficient in operation.

Although considerable attention has been devoted toward abatement of the smoke and soot nuisance, the discharge of fly ash and cinders into the atmosphere is becoming more prevalent. This largely results from the practice of burning slack coal under forced draft in industrial plants, and additionally, from the wide-spread use of forced draft, automatic stokers in home heating plants. Under these firing conditions, the discharge of smoke is minimized, but increased precipitation of fly ash, cinders, and partially burned particles of fuel is the result.

The present invention is especially adapted to separate these objectionable materials from the flue gases of forced draft furnaces, which discharge considerable amounts of heavy particles, especially when fired with slack coal. The separator is relatively simple in design and is characterized by the absence of restricted passageways, and therefore does not reduce the velocity of the gases passing from the furnace.

The separator or trap of the present invention, therefore, is designed for use with furnaces operated under forced draft, or having a high velocity of flue gas movement, in which the gas is substantially free of soot or other light matter, but carries considerable amounts of ash and other substantially heavy particles.

It has been an object of the present inventor to provide a fly ash trap, or separator, of simplified structure, for the above specified uses, which is efficient in separating the solid matter from gases moving at high velocity, and which is substantially free of obstructions to the free passage of the gases, and therefore permits the smokeless combustion of the fuel.

It has been another object to provide a separator which is continuous in operation and which automatically collects the separated material and conducts it to a point removed from the separator. For this reason, the separator is admirably suited to home use, because it requires no attention, such as cleaning or removing the recovered solid matter. Moreover, the separator may be installed directly upon the furnace, as opposed to the usual unsightly installation on the chimney or stack.

Other objects and advantages will be more fully set forth in a description of the accompanying drawing, in which.

Figure 1:
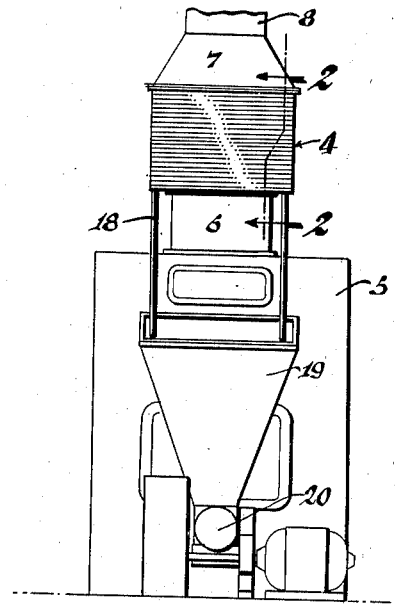
Figure 1 is a front view of a furnace with the separator installed thereon.

Referring specifically to the drawing, the separator housing 4 is in the form of a box or chamber, preferably of rectangular shape. The separator is shown installed on the top of a furnace 5, at a point where the stack or flue normally connects to the combustion chamber. The housing is supported on its lower side on an intake duct or flue section 6, in communication with the combustion chamber of the furnace. The housing 5 includes a tapered outlet flue 7 at its upper side in communication with the stack or chimney 8, to conduct the gases to the atmosphere.

The interior of the housing or chamber includes a plurality of baffles or deflector plates 9, which causes the upwardly moving gases to take a circuitous, zig-zag path. The first of this series of baffles, namely 10, constitutes a perpendicular wall surface having a curved upper portion 11, the forward edge of which terminates substantially in a horizontal plane. The baffle 10 is located adjacent the intake opening 12 of the separator housing.

A second baffle 13 is disposed directly above the first, and spaced upwardly a sufficient distance to permit an unrestricted flow of gas. The distance between the two baffles is substantially equal in width to the width of the intake opening 12 located at the bottom of the chamber.

The third or uppermost baffle 14 overhangs the second baffle in the same manner, from an opposite side of the separator housing. Each of the baffles has a curvature taken on a radius described from a nearly common point. This arrangement provides equal spacing between the baffles, and the passageway between the baffles is therefore of substantially equal area. Also, due to the fact that the baffles terminate a distance from the adjacent wall substantially equal to the spacing of the baffles, the uniformity of the passageway is further maintained. The passageway thus provided is of S-shape and of substantially equal area throughout. The baffles or deflectors, 13 and 14, are secured to the housing at the opposite longitudinal ends of the housing and have their side edge margins attached to and in communication with ash collecting pockets or passageways, 15, 16, and 17. Each baffle terminates at a respective pocket, all of which pockets extend downwardly and communicate with ash receiving pipes or conduits 18. The conduits 18 extend downwardly, and in this instance, are shown entering into the fuel hopper 19 of a stoker 20.

As the rapidly ascending ash laden gas passes between the series of baffles, it takes a curving zig-zag path. At each reversal of direction, the proportionately heavier particles carried in the gas, due to inertia, continue to travel in a horizontal line after leaving the edge of the baffles, and thus are separated from the gas.

Figure 2:
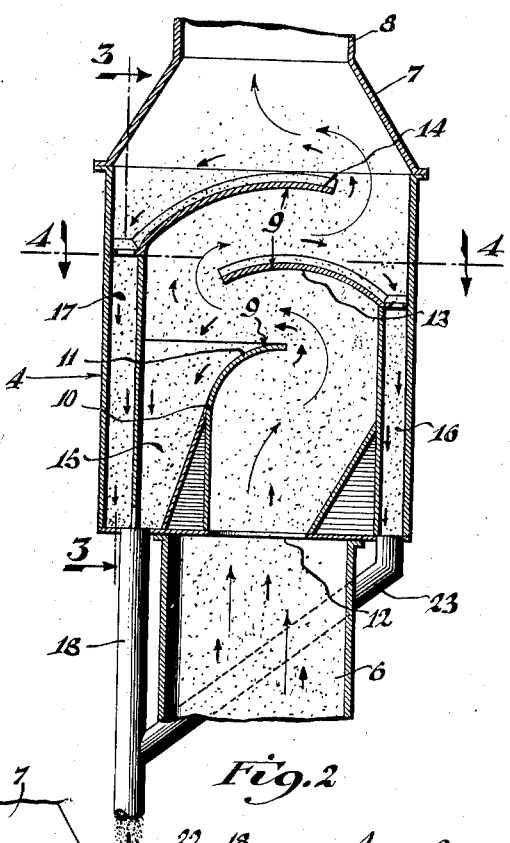
Figure 2 is a sectional view taken on line 2—2, Figure 1.
Figures 3, 4:
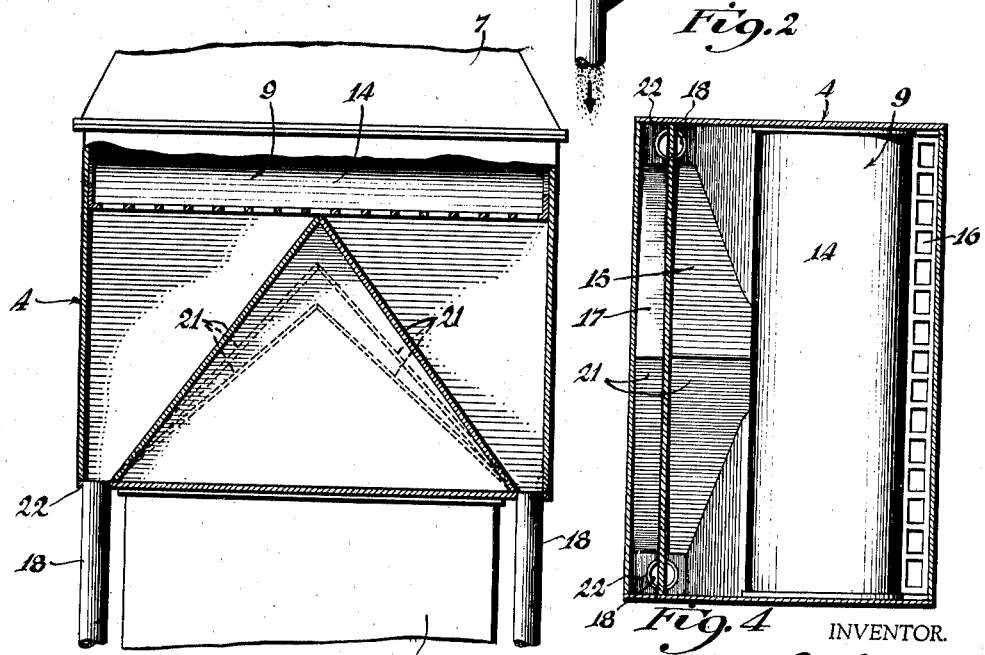
Figure 3 is a sectional view taken on line 3—3, Figure 2, illustrating one of the ash disposal passageways and guiding surfaces.
Figure 4 is a sectional view taken on line 4—4, Figure 2.

As will be observed in Figure 2, the particles continue in their line of motion along the top of the baffle until they reach the ash passageways. The baffles, 13 and 14, include perforated portions over the passageways, 15 and 16, to permit entry of the ash particles into the passageways. Each passageway, 15, 16, and 17, includes a pair of inclined guide surfaces 21 (see Figure 3) of relatively steep pitch and terminating at a point at the top center of the passageway. These inclined members serve to guide the falling ash to the opposite sides of the passageways. The lower edge of each inclined member terminates at an opening 22, in communication with a particular conduit 18, forming, in conjunction with the end wall of the housing, a funnel for the particles. The conduits are in connection with the bin or hopper, and thus serve to conduct the particles from the separator.

Each of the conduits 16 constitutes a Y-shaped manifold, having at its upper end an angular limb 23 for connection to the rear ash passageway. In this manner, each of the four corners of the separator is in communication with the ash disposal conduits.

The separator is fabricated of sheet metal and the various parts are riveted or welded together. This construction is relatively inexpensive, and in addition, provides a light weight structure which is readily installed, and requires no supporting structure other than the furnace or boiler upon which it is installed.

It will be noted that the curved deflector plates extend to the open upper ends of the respective receiving pockets or compartment which they serve. By this arrangement, the top surface of the deflectors acts as a continuation of the compartments and conducts the precipitated solid matter to the open receiving end of the respective compartments.

The curvature of the deflectors tends to accommodate the free passage of the gas, since the curved passageway formed between the deflectors conforms more nearly to the natural curving zig-zag path which the gas is forced to take in passing between the series of deflectors. The gas, therefore, flows smoothly over the deflectors with a minimum of turbulence, such as would be present were the deflectors formed of flat plates. The relatively heavy particles present in the gas are carried across the top of the deflectors and continue in a relatively straight line to the receiving compartment. This occurs as the gas curves upwardly away from the deflector surface to pass around the leading edge of the next deflector. It has been discovered that the curvature of the deflectors results in greatly increased efficiency in the separation of ash over the use of the flat deflector or baffle.

As disclosed, the ash collecting compartments communicate with receiving conduits 18 adapted to convey the ash to a point of disposal. These pipes are open at all times and, if desired, may be extended to the ash pit or other air intake of the furnace, in order to produce a down draft in the conduits 18, to accelerate the disposal of the ash.

Having described my invention, I claim:

1. A device for separating and disposing of solid particles from the ascending flue gases of furnaces and the like comprising, a chamber having intake and outlet openings, a plurality of particle receiving compartments on relatively opposite sides of said chamber, each of said compartments including an inwardly extended deflector plate attached thereto along the open upper end of said compartment, said deflector plates spaced apart and having their free edges terminating a sufficient distance inwardly of the walls of said compartment to provide a tortuous passageway for the gases, so as to separate the solid particles therefrom by centrifugal force and deposit the same in the receiving compartments.

2. A device for separating and disposing of solid matter from the flue gases of furnaces and the like comprising, a chamber having intake and outlet openings, a plurality of receiving compartments disposed on opposite sides of said chamber, and each of said compartments having a curved deflector extended alternately from opposite receiving compartments and partially the width of said chamber, said deflectors disposed in spaced superposed relationship, to define a curving zig-zag passageway of substantially constant area throughout its length, for the passage of the gases.

3. A fly ash trap, comprising, a casing structure, said casing structure including curved baffle plates disposed across the interior thereof, said baffles having arcuate form and having their curvatures disposed on radii taken from a common center, each baffle plate stopping short of the opposite wall of the casing, said baffle plates spaced and arranged so as to provide a sinuous passageway for the gases moving through the trap.

4. A fly ash trap, comprising, a casing structure, baffle plates disposed across the interior of said casing and arranged to provide a winding passageway for gases moving through the casing structure, each of said baffles curving downwardly to an adjacent side of the casing from its free edge to provide a pocket in conjunction with the adjacent side of the casing for receiving the fly ash as it drops from the free leading edge of the baffle disposed over the particular baffle, and receptacles for receiving the fly ash from said pockets.

5. A fly ash trap, comprising, a casing structure, and curved baffle plates disposed across the interior of said casing structure, each baffle disposed on a radius taken from a center common to all of the baffles, and providing a free edge spaced from the opposite wall of the casing, the free edges of certain of said baffles disposed lower than their respective tops, whereby the fly ash is directed downward slightly and will assume either a horizontal or a downward path, thereupon leaving the sinuous course of the gases flowing through the trap.

6. A device for separating and disposing of solid particles from flue gases and the like comprising, a chamber having a lower intake opening and an upper outlet opening, a plurality of baffle plates extended alternately from opposite sides of said chamber for defining a tortuous passageway for the gases, collecting chambers respectively disposed at said opposite sides, one respectively for each of said baffles, each of said chambers terminating at its open upper end along that edge of the respective baffle which is adjacent the respective chamber, and adapted to receive the solid material separated from the ascending flue gases, and conduits for conducting the solid material from the chambers.

7. A device for separating and disposing of solid matter from flue gases and the like comprising a rectangular casing providing a series of parallel passageway defining plates arranged to provide a tortuous path for the gas flow, each plate having an attached edge adjacent a wall of the chamber, a chamber for each plate extending downwardly from the edge of the plate which is adjacent the casing wall, said chambers including inclined directing plates for directing the separated solid particles to predetermined regions at the base of the casing, and discharge tubes extending from said regions to a receptacle.

8. A device for separating and disposing of solid matter from flue gases and the like comprising a rectangular casing providing a series of parallel plates arranged to provide a tortuous path for the gas flow, each plate having an attached edge adjacent a wall of the casing, a chamber for each plate extending downwardly from the edge of the plate, which is attached adjacent the respective side of the casing, said chambers including inclined directing plates extending downwardly from a central point for directing the separated solid particles to predetermined regions at the base of the casing, and discharge tubes extending from said regions to a common receptacle.

JOHN A. CRUM.